United States Patent [19]

Davidowski et al.

[11] Patent Number: 5,063,494
[45] Date of Patent: Nov. 5, 1991

[54] PROGRAMMABLE DATA COMMUNICATIONS SYSTEM

[75] Inventors: Dennis J. Davidowski, Warminster; Michael J. Saunders; Steven M. O'Brien, both of Norristown, all of Pa.

[73] Assignee: Unisys Corporation, Blue Bell, Pa.

[21] Appl. No.: 336,980

[22] Filed: Apr. 12, 1989

[51] Int. Cl.$^5$ .......................... G06F 9/00; G06F 3/00; G06F 13/00

[52] U.S. Cl. ................................ 395/800; 364/260.1; 364/240.2; 364/240.1; 364/238.3; 364/228.5; 364/DIG. 1

[58] Field of Search ... 364/200 MS File, 900 MS File

[56] References Cited

U.S. PATENT DOCUMENTS

| | | | |
|---|---|---|---|
| 4,003,032 | 1/1977 | Austin et al. | 364/200 |
| 4,025,906 | 5/1977 | Riikonen | 364/200 |
| 4,261,033 | 4/1981 | Lemay et al. | 364/200 |
| 4,485,439 | 11/1984 | Rothstein | 364/200 |
| 4,494,194 | 1/1985 | Harris et al. | 364/200 |

*Primary Examiner*—Eddie P. Chan
*Attorney, Agent, or Firm*—John B. Sowell; Mark T. Starr; Thomas J. Scott

[57] ABSTRACT

The present invention provides a novel programmable data communications controller employed to accept data from a host computing system and for transmitting the data to a terminal designated by the host computer system. The data computer communications controller is further provided with protocols, parameters and poll tables stored in a dedicated memory of the data communications controller which enables the controller to receive data and address information from a main memory of a host computer and to reformat and pre-package the information in a protocol format block acceptable by a terminal coupled to the data communications controller. Different protocols, parameters and polls are provided in the data communications controller in the form of preprogrammed information which enables different terminals employing different protocols and protocol formats to be coupled directly to a data link interface bus without hardware modifications. Different protocols are loaded into the main memory of the main computer system and down loaded into the bit map memory of the data communications controller upon initialization of the system.

8 Claims, 7 Drawing Sheets

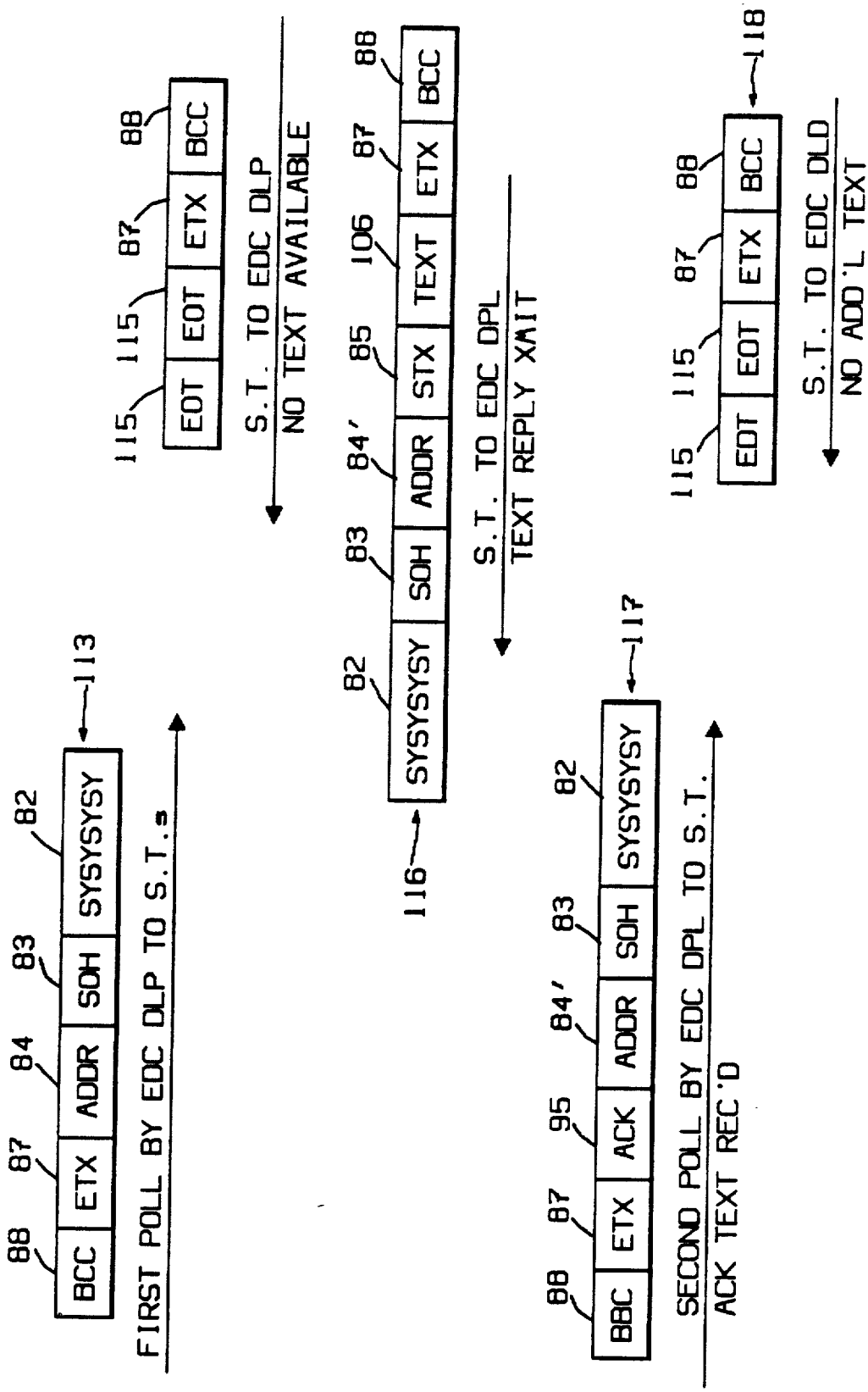

PROGRAMMABLE DATA COMMUNICATIONS CONTROLLER

Related Applications

This application relates to our co-pending U.S. Application Ser. No. 07/329,136 filed 27 Mar. 1989 entitled "Dual Operating System Computer".

FIELD OF THE INVENTION

The present invention relates to a Data Communications Controller forming an interface between a data link interface bus and a smart terminal. More particularly, the present invention relates to apparatus for enhancing existing type data communications controllers (or data link processors).

DESCRIPTION OF THE ART

Computer systems capable of receiving and transmitting data over communications lines generally employ one of two common and distinct architectural approaches. One approach is the character interrupt driven approach and the other approach is a direct memory access (DMA) approach of data transfer. Such data transfer apparatus is classified in U.S. Class 364, subclass 200 corresponding to International Class G06F, subclass 13/32.

Typical of such apparatus is found in U.S. Pat. No. 4,716,523 granted to IBM and directed to a modified direct memory access (DMA) controller having interrupt and arbitration features. This patent recognized that it would be desirable to combine the two above mentioned distinct architectural approaches into a single controller. In so doing, the system is provided with two distinct controllers. The prior art architecture employs arbitration logic connected to receive a request from a plurality of communication channels for data transfer operations. The arbitrator is configured by programming to assign a mode of data transfer operation for each channel as selected by the system user. Arbitration among competing contemporaneous request is provided by an arbitration means in the circuit and an appropriate DMA or character interrupt request is then given either to a DMA interrupt controller or to a character interrupt controller each of which resides separately and independently in the architecture of the system. This prior art system employs one USART for each port and one port interface controller for every two ports or lines. The port interface controller is not programmable and the DMA/Interrupt Controller and Arbitrator (DAC) is factory programmed for one of the two aforementioned alternative modes of data transfer operation.

It would be desirable to provide an enhanced data communication controller which completely eliminates the requirement for a port interface controller and which will accept data from numerous types of smart terminals and may be programmed or reprogrammed in the field without hardware modification to operate in a multi-protocol mode to allow a plurality of different smart terminals to have access to the computer system.

SUMMARY OF THE INVENTION

It is a primary object of the present invention to provide an enhanced data communications controller which operates in a multi-protocol mode to allow different terminals to have access to the main computer system.

It is another object of the present invention to provide an enhanced data communications controller which operates in a distributed communications mode freeing the main processor in the computer system from data communications management functions.

It is another object of the present invention to provide a novel data communications controller having a plurality of communication ports or lines each of which has an associated programmable protocol capability to permit different types of terminals to be cheaply and efficiently incorporated into a computer system.

It is another object of the present invention to provide a novel data communications controller capable of supporting up to eight communication lines where each line is provided with means for programming a distinct and different protocol for up to 80 terminals on each line.

It is a general object of the present invention to provide a novel programmable data communications controller adapted to support different terminals made by Burroughs Corporation and/or Sperry Corporation on mainframe computing systems made by Unisys Corporation.

It is another general object of the present invention to provide a novel open system data communications controller adaptable to support smart terminals of many various protocols without hardware modifications.

According to these and other objects of the present invention, there is provided an enhanced data communications controller which will accept data from numerous smart terminals having different protocol formats and which reformats the information received from the smart terminals into a prepackaged protocol format acceptable to the main computer processor and its associated main memory and/or to accept data and designated address information from the main memory of the main computer and reformat and pre-package information into a protocol format acceptable to any of the smart terminals.

BRIEF DESCRIPTION OF THE DRAWINGS

FIG. 7 is a block protocol diagram showing the present invention enhanced data communications polling protocol for input of information from a terminal to the enhanced data communications controller.

DESCRIPTION OF A PREFERRED EMBODIMENT

Figure 1:
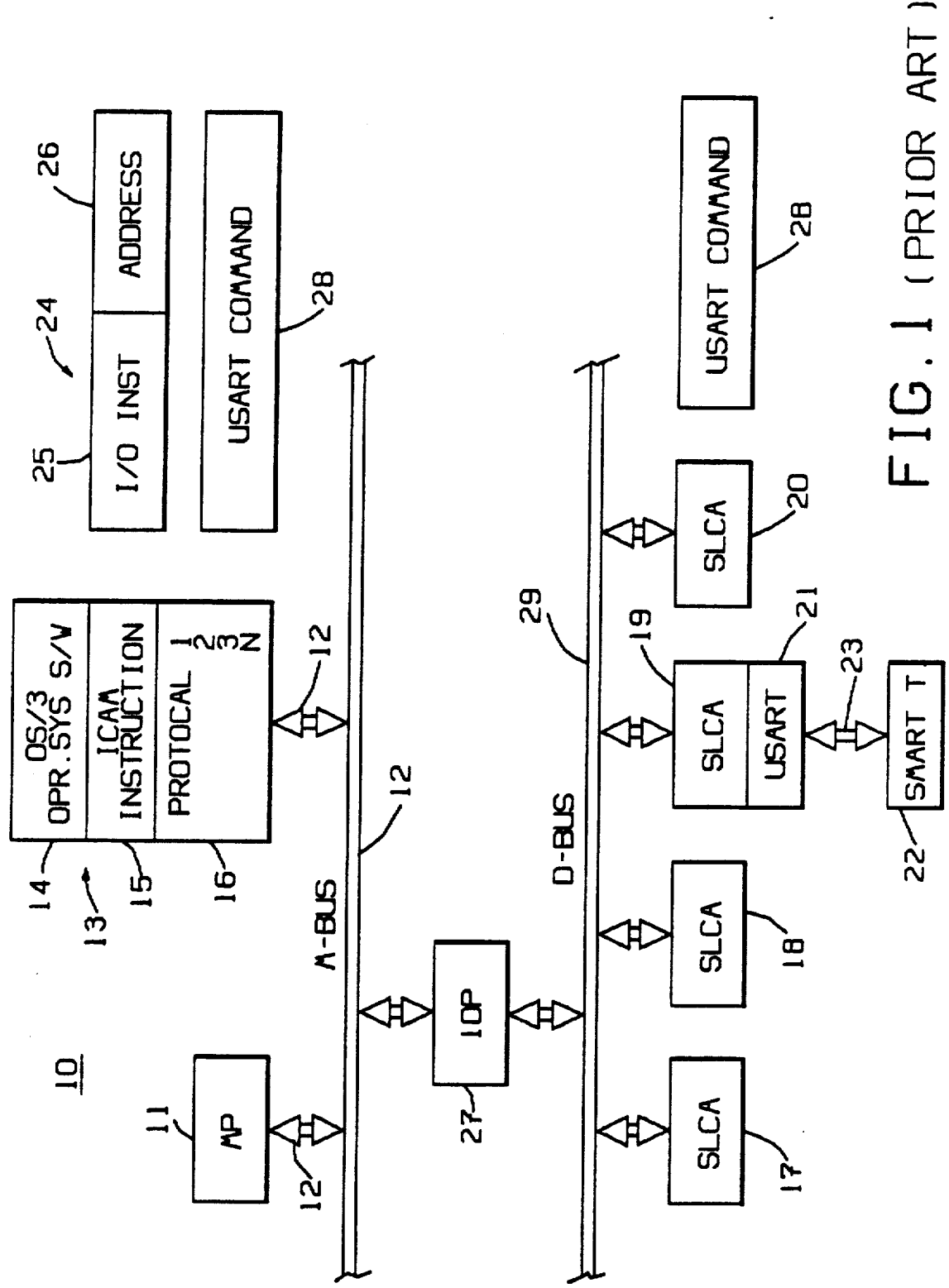
FIG. 1 is a block diagram of a prior art computer system showing Single Line Communication Adapters (SLCAs) coupled to a single USART which is connected to a single communications line which supports a plurality of smart terminals.

Refer now to FIG. 1 showing a block diagram of a prior art computing system 10 comprising a main processor 11 connected by a main bus 12 to a main memory 13. The main memory 13 is shown having a portion 14 comprising the operating system software (OS 3 software), and a portion 15 in which is stored the communications software (ICAM) instructions. Portion 16 of memory 13 is shown having stored therein a plurality of protocols employed by the Single Line Communication Adapters 17 through 20. Each of the communication adapters 17 to 20 is connected to its own Universal Synchronous Asynchronous Receiver Transmitter (USART) 21. The USART 21 is coupled to a plurality of smart terminals 22 via a line or port 23.

The main processor 11 fetches an ICAM instruction in main memory 13, shown as instruction 24 comprising an IO instruction 25 and an associated address 26. The main processor executes the instruction 24 and causes the input/output processor (IOP) 27 to fetch the instruction at the address 26 which comprises a USART command that is sent out to the SLCAs where the command is executed. The IOP 27 provides the address where information from the smart terminal 22 is written in memory 13. Similarly, the IOP supplies the designation address for identifying the smart terminal 22 where information from main memory 13 is to be written. Thus, it will be understood that any command carried out by a USART 21 requires fetching the USART command 28 from the main memory 13 and carrying out the instruction by the IOP via the D bus 29 which connects to the SLCAs. The SLCAs 17 to 20 carry out the USART commands under the supervision of the IOP 27 which serves as a bus controller.

Figure 2:
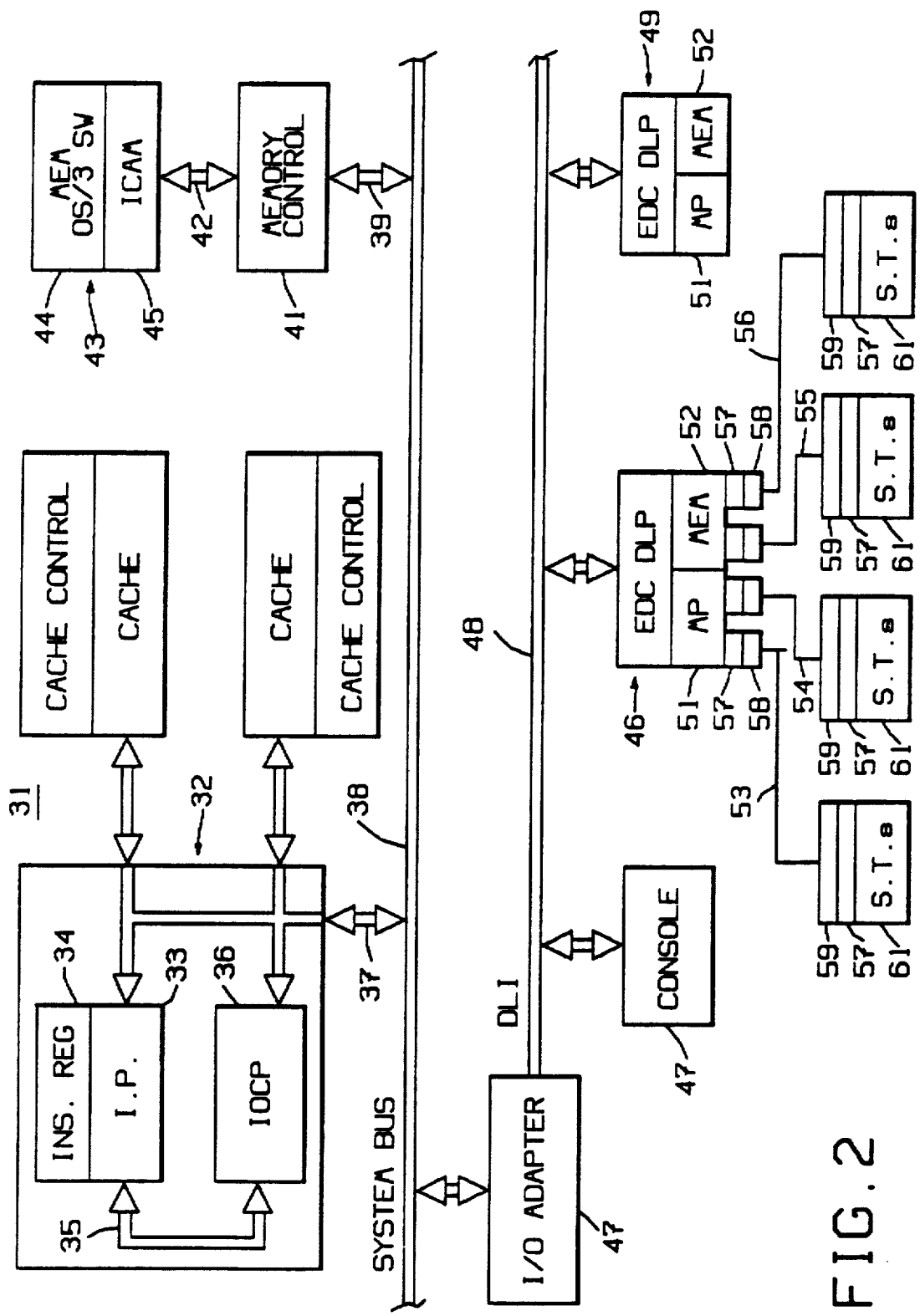
FIG. 2 is a block diagram of a modern computing system in which the present invention enhanced data communications controller is utilized.

Refer now to FIG. 2 showing a block diagram of a modern computing system 31 in which the present invention data communications controller is utilized. The mainframe computer illustrated herein is described in greater detail in our copending U.S. Application Ser. No. 07/329,136. The mainframe computing system 31 comprises a processor module 32 having an instruction processor 33 and an associated instruction register 34 coupled via bus 35 to an input/output control processor 36. The processor module 32 is coupled via bus 37 to the system bus 38 and bus 39 to the main memory controller 41. The main memory controller 41 is coupled via bus 42 to the main memory 43 which is shown comprising the operating system software portion 44 and the communication software portion (ICAM) 45. Communications instructions described previously are stored in the communication software portion 45 and are transferred to the instruction register 34 of the instruction processor 33. The instruction in the instruction register 34 is carried out by the IOCP and comprises a transfer of information from the main memory 43 to the Enhanced Data Communications Data Link Processor 46 (EDC DLP). It will be understood that the blocks of data transferred from main memory 43 are now buffered and stored in the data communications controller 46 which will now transfer the information without further supervision of the IOCP to the terminals 61 as will be explained in detail hereinafter. IO adapter 47 is coupled between the systems bus 38 and the data link interface bus 48 which may support a plurality of data communications controllers 46, 49, etc. according to the present invention. Controller 46 is shown comprising a microprocessor 51 and an associated dedicated memory 52. Each line 53 to 56 is shown connected to the communications controller 46 through a modem 58 and a serial to parallel converter 57. The serial to parallel converter 57 is preferably a Zilog 8530 converter or equivalent integrated circuit.

In similar manner, the remote end of lines 53 to 56 are shown connected to terminal multiplexers 59, similar to a modem, and a serial to parallel converter 57 which interfaces with or connects to a plurality of smart terminals 61. In the preferred embodiment of the present invention, the FIG. 2 computing system 31 is a model 7E (System 80) Unisys mainframe computer. The enhanced data controllers 46 and 49 are shown having four channels or lines each of which may support up to approximately 80 smart terminals. The data controllers 46,49, etc. are provided with means for expanding the number of lines or channels up to eight if necessary for an optimum configuration. Before explaining the detailed operation of the data controller 46, it will be understood that the protocols which are stored in dedicated memory 52 are down loaded from the main memory 43 upon initialization of the present system. In the preferred embodiment, protocols for numerous types of terminals may first be taken from disk or tapes and loaded into main memory and subsequently down loaded to the dedicated memory 52 upon initialization of the system.

Figure 3:
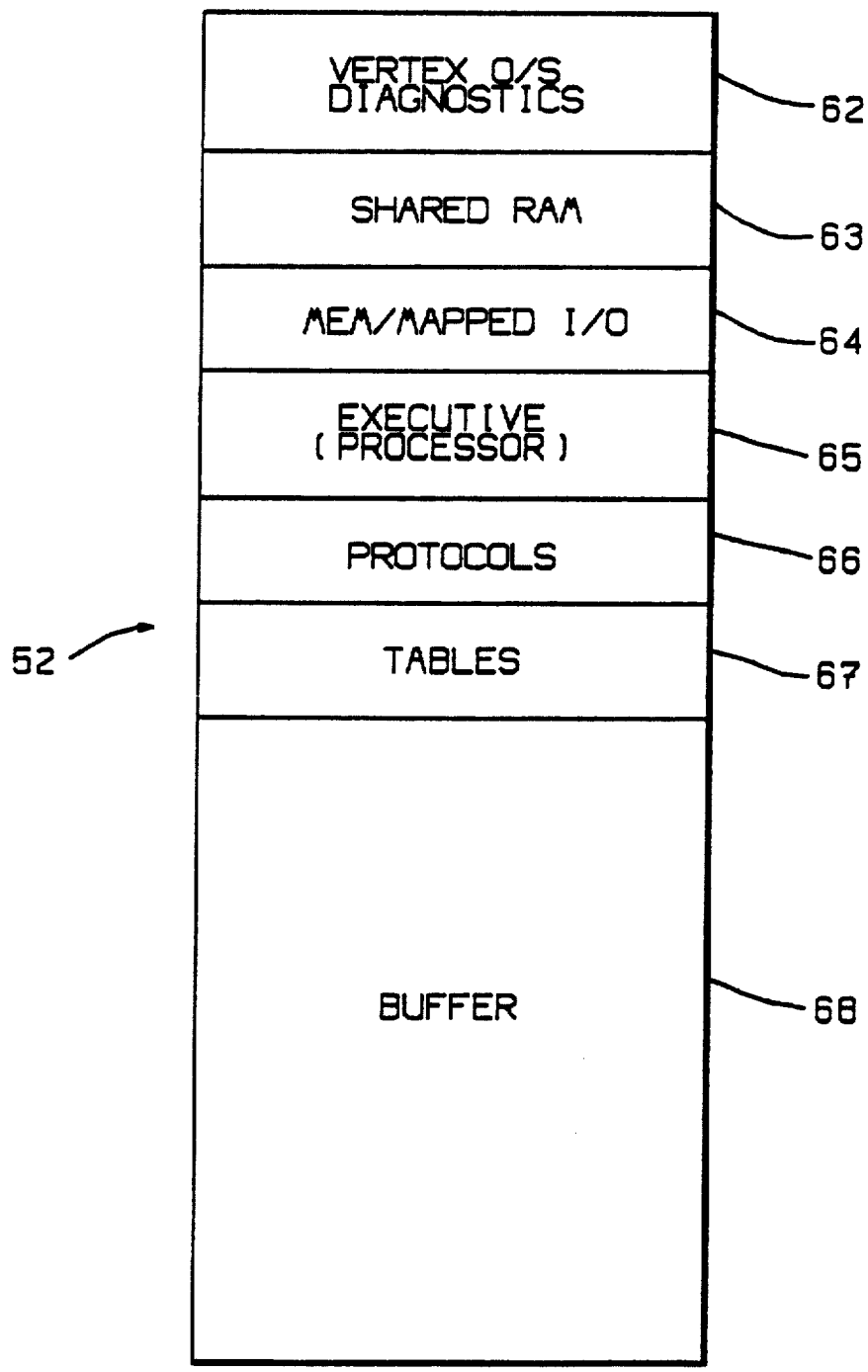
FIG. 3 is a block diagram depicting the memory management map employed in the present invention data communications controller.

Refer now to FIG. 3 showing a block diagram depicting the memory map in the dedicated memory 52 of the data communications controller 46, 49 etc. Memory map 52 comprises an operating system and diagnostics portion 62 which is embodied on the board of the controller 46 as firmware. The shared RAM portion 63 and memory/mapped IO portion 64 are used to control hardware operations of the controller 46. Portion 65 to 67 are the portions of the memory map which are downloaded from the main memory 43 of FIG. 2. The executive portion 65 serves as a buffer controller and command controller for the data communications processor 46. The protocols portion 66 define the medium for terminal operation as will be explained in more detail hereinafter. Portion 67 comprising tables consisting of poll tables, line parameters, the terminal configurations and other parameters defining the data communications system 46. Buffer portion 68 preferably comprises approximately one megabyte of memory used for storing input/output data to and from the terminals.

A feature of the present invention permits change and alteration of the memory map 52 portions 65 to 67 without any change of hardware to adapt the data controllers 46, 49 for use with numerous types of terminals having different protocol formats.

Figure 4:
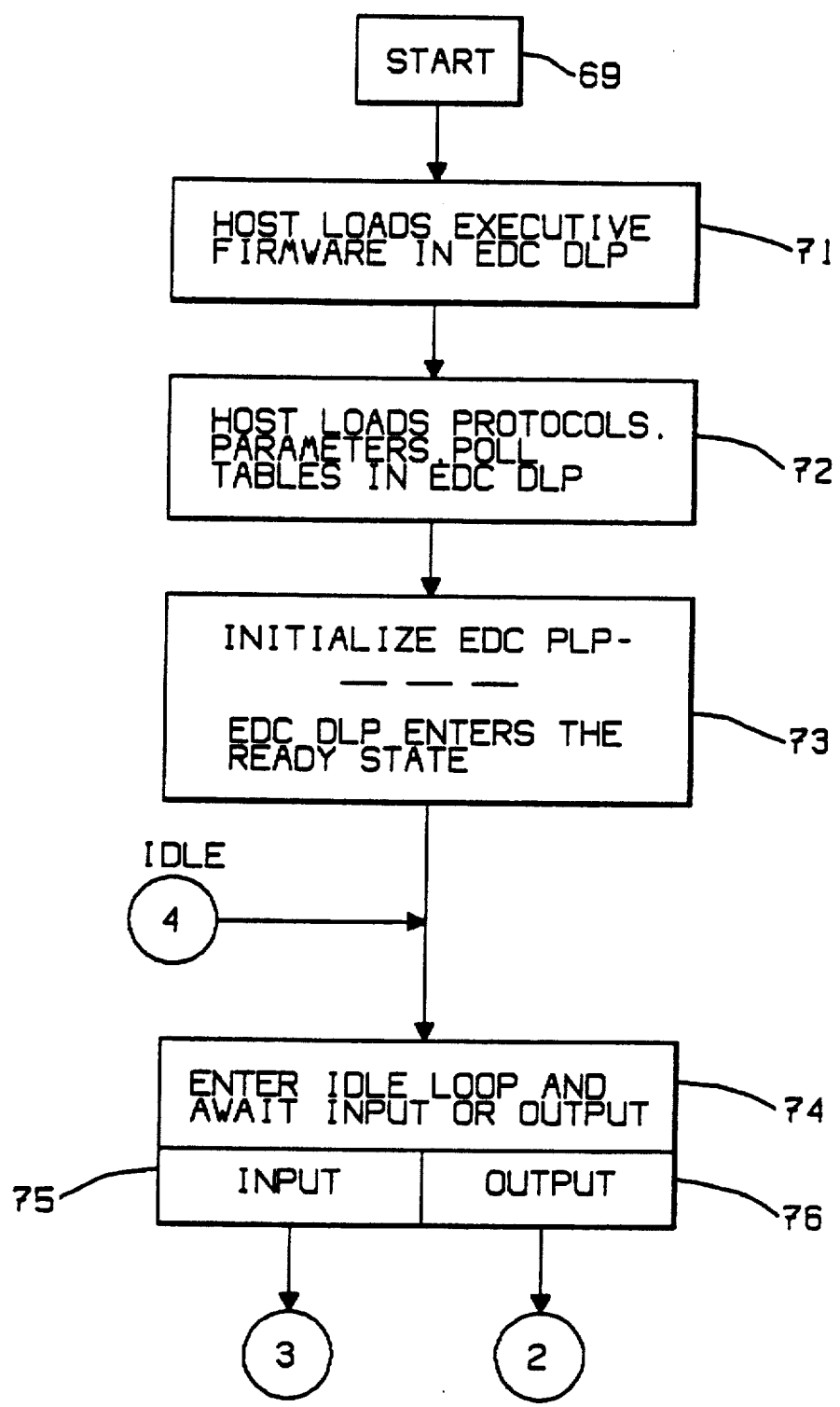
FIG. 4 is a block diagram of the initialization and idle loop procedure employed by the enhanced data communications controller.

Refer now to FIG. 4 showing a block flow diagram of the initialization procedure and idle loop procedure for the data communications controller 46. The start command 69 at the data controller 46 is initiated at the main processor 33 which first loads the memory map 52 with the information shown in FIG. 3 at block 71. The variable portion of the software is loaded at block 72, then the data controller (EDC DLP) 46 and the data controller 49 is initialized enters into the ready state at block 73. Block 74 illustrates an idle loop in which the data controller 46 monitors or looks for an input or output which may be executed. The first input or output detected causes the data controller to enter an input phase at block 75 or the output phase at block 76 as will be explained hereinafter. After executing an input or an output at points 3 or 2, the data controller 46 reenters the idle loop at point 4.

Figure 5:
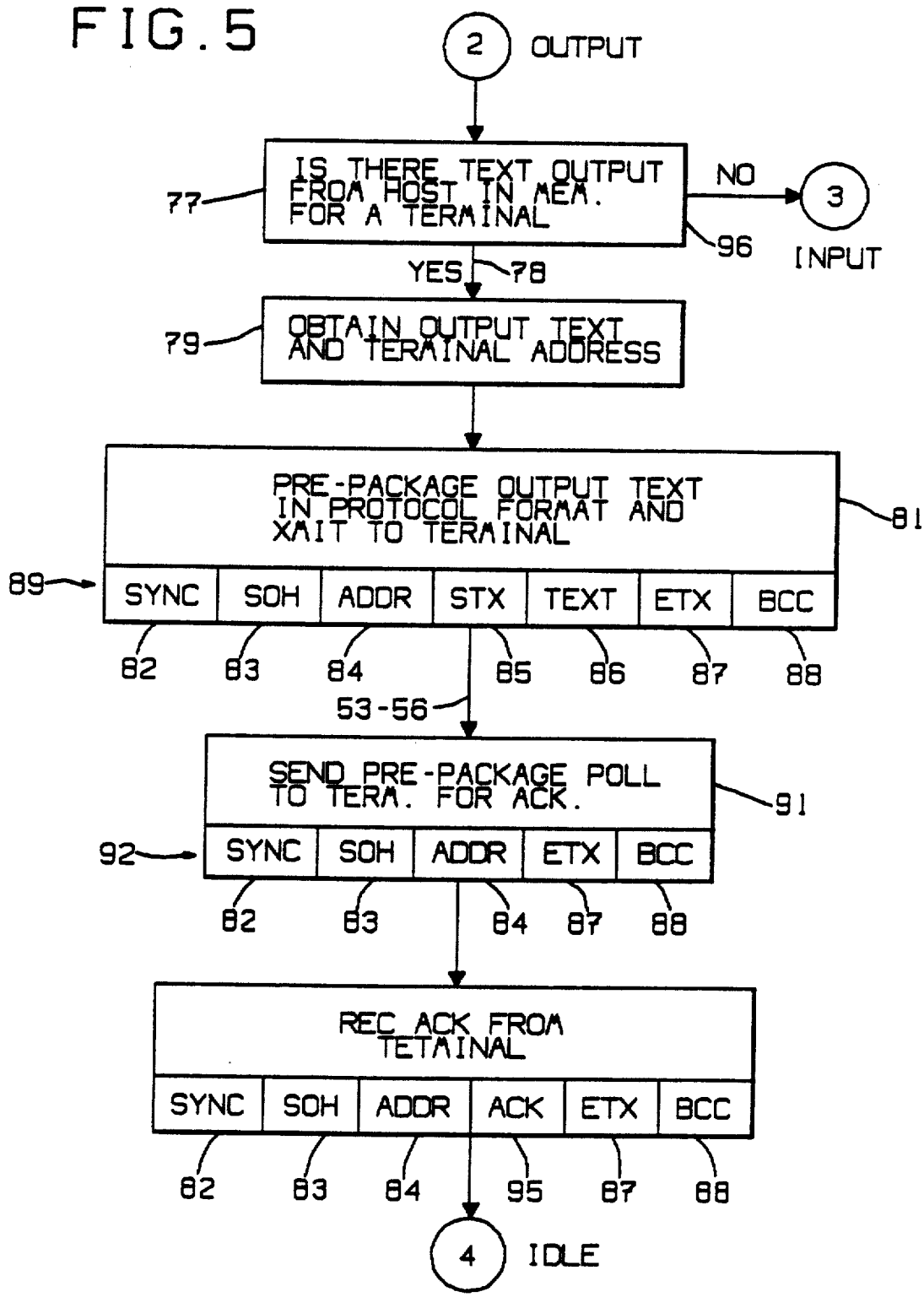
FIG. 5 is a block diagram showing the procedure for generating output of data from the present invention enhanced data communications controller to a smart terminal.

Refer now to FIG. 5 showing a block flow diagram for output of data from the data controller 46 to a smart terminal 61. Upon entering the output phase at point 2 a logical determination is made at block 77 whether there is text output from the host that is now stored in the buffer portion 68 of dedicated memory 52. If data is present, the data controller 46 proceeds logically via line 78 and obtains the output text and terminal address to which the text information is to be set at logic block 79. The information is pre-packaged at logic block 81 in a predetermined protocol format acceptable by the terminal in question and the information is transmitted to the terminal, such as UNISCOPE (TM) a smart terminal. The pre-packaged formatted protocol information comprises sync characters 82, start of header character 83, address characters 84, start of text character 85 and a block of text 86 followed by an end of text character 87 and a block check character 88. It will be understood that other terminals than UNISCOPE terminals will employ different formats which may vary from the present example but will always include the address portion 84 and the text portion 86 which was obtained from the main memory and down loaded to the buffer portion 68 of the dedicated memory 52 of the data controller 46. The pre-packaged protocol format 89 is then transmitted via the lines 53 to 56 to the terminal and followed by a pre-packaged first poll to the terminal for acknowledgement as shown as logic block 91. The pre-packaged first poll for acknowledgement protocol 92 comprises the aforementioned characters in protocol 89 as shown at block 92 and are numbered the same as protocol 89. A reply on the same lines 53 to 56 from the terminal is sent back to the data controller 46 which receives the acknowledgement at logic block 93. The protocol 94 for aknowledgement by the terminal is shown employing the same characters employed in protocol 89 and 92 and are numbered the same but further includes the acknowledgement character 95. After receiving the acknowledgement protocol 94, the data controller 46 returns to the idle loop at point 4. If a determination was made at logic block 77 that no text output was stored in memory for transmission to a terminal, the logic at block 77 exits via line 96 and enters the input point 3 to check for input after having determined that there is no output.

Figure 6:
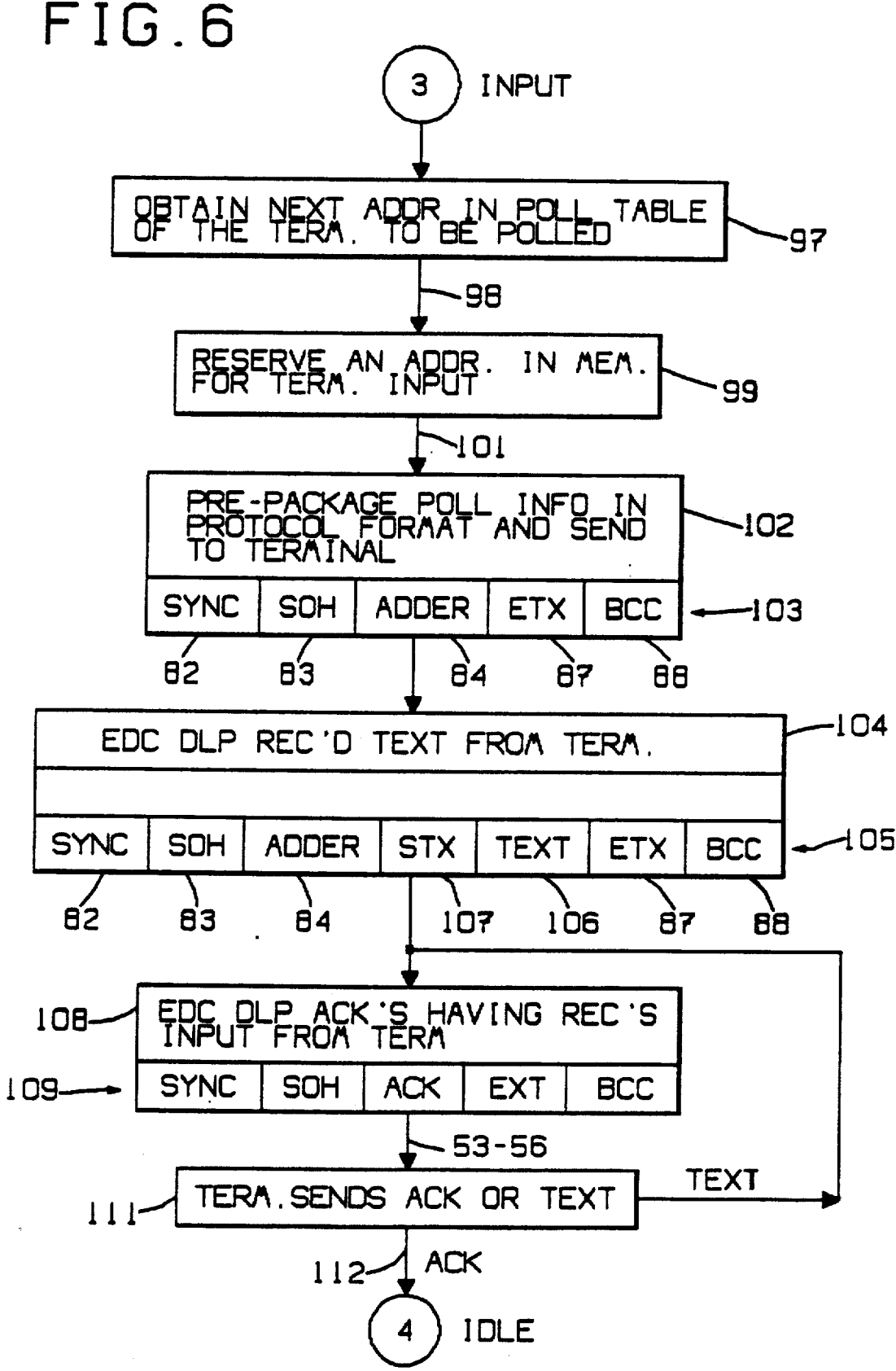
FIG. 6 is a block flow diagram showing the procedure for generating input of information data from a smart terminal to the present invention enhanced data communications controller.

Refer now to FIG. 6 showing a block flow diagram of input from a smart terminal to a data controller 46. Upon entering the input phase at point 3 the logic at block 97 causes the data controller 46 to obtain the next address stacked in the poll table 67 of the memory map 52. The logic exits via line 98 and enters logic block 99 which causes the data controller 46 to reserve a portion of buffer memory 68 in anticipation of receiving information from a terminal and exits via line 101 to logic block 102. The data controller 46 pre-packages the poll information comprising the address of a terminal to be polled in protocol format form and sends this information to the predetermined line to which a plurality of terminals are connected, any one of which may be ready to respond. The protocol pre-packaged format 103 for a UNISCOPE (TM) terminal is shown comprising a plurality of sync characters 82, a start of header character 83, address characters 84, an end of text character 87 and a block check character 88. The protocol block format 103 is received at the terminal at logic block 104 and issues an automatic response including a designation address 84 and text 106 which is stored in the buffer at the address previously obtained at logic block 99. The format for the text protocol is shown at protocol format block 105 comprising the aforementioned data characters and now further including a plurality of input character text 106 and a start up text character 107. The other format characters are the same as before and are numbered the same as before. Having received and stored the text information 106 in the buffer memory 68, the data controller 46 pre-packages an acknowledgement poll in protocol format at logic block 108 and transmits the acknowledgement protocol poll 109 back to the terminal via one of the lines 53 to 56. The terminal then sends back a NO traffic acknowledgement or further text as shown at logic block 111. If there is a no traffic acknowledgement, the data controller 46 exits via line 112 and enters the idle loop at point 4 previously discussed with regard to FIG. 4. If additional text is being transmitted by the terminal, logic block 111 exits via line 110 performs the logic shown at block 104, and enters logic block 108 in a loop which continues until all text from the terminal is transmitted to the data controller 46 and the terminal sends a no traffic acknowledgement response causing the logic in block 111 to exit on line 112 to the idle loop at point 4.

Refer now to FIG. 7 showing a block diagram of the present invention enhanced data communications controller polling for the input operation from a terminal. The first poll protocol format block 113 comprises the aforementioned sync characters 82, the start of header character 83, the address characters 84, the end of text character 87 and the block check character 88. This information is sent on a line to a plurality of terminals, one of which may raise an active reply. If none of the terminals on the line have input text available, a no traffic response is returned as shown at protocol format block 114 comprising two end of traffic characters 115, an end of text character 87 and a block check character 88. Since the first poll is a poll of one of the lines 53 to 56, the reply protocol format 114 informs the data controller 46 that no text is available at the terminals on this line.

Had there been text available at one of the terminals a protocol format 116 would be returned to the data controller 46. It will be noted that the protocol format 116 is a more detailed protocol format and is identical to the protocol format 105 shown in FIG. 6. The transmitted text reply is received by the data controller 46 which also checks for errors employing the block check character 88. If an error in transmission occurs, the data controller 46 will cause a retransmission request resulting in a retransmission of the protocol block 116. If retransmission is requested for a predetermined number of times without successful transmission, an error is reported to the host processor. However, if first or subsequent requests for transmission are successful, the data controller 46 raises a second poll acknowledging that the text is received as shown at protocol block 117 comprising the aforementioned identified characters shown. The terminal identified by the line and terminal address 84 responds with the format protocol block 118 comprising the aforementioned characters informing the data controller 46 that no additional text is available. At this point the data controller 46 enters the idle loop at point 4.

Having explained a preferred embodiment of the present invention, it will be understood that the protocol stored in portion 66 of bit memory map 52 of the data controller 46 is executed by the processor 51 shown in FIG. 2. In the preferred embodiment of the present invention an Intel 80286 microprocessor was employed and the protocols were written in Intel PLM 86 and ASM 86 languages which are commercially available. However, other microprocessors employing other languages may be employed in the novel data controller 46.

Having explained how the data controller 46 can be programmed with various protocols without any hardware modification to the computer system shown in FIG. 2, it will be understood that terminals of various origins of manufacture which employ substantially different protocols may now be incorporated into a large data communication system of the type described hereinbefore. Once a protocol is written for any particular terminal and recorded on a tape or disk it is transportable to other systems employing the novel data controllers 46 without any hardware modification. The novel data controller 46, once supplied with the information from main memory 43 and IOCP 36 shown in FIG. 2 operates in a distributed processing mode and does not require additional information from the main processor 32 in order to transfer information from the dedicated memory 52 to a terminal or vice-versa. The manner in which information is transmitted from a main memory 43 to single line controller adapter (SLCA), or to the data controller 46, or from the buffer memory 68 of the bit map memory 52 of data controller 46 to the main memory 43 under control of the IOCP 36 is well known from the aforementioned application Ser. No. 07/329,136 and does not require a detailed explanation herein.

What is claimed is:

1. A high speed external data communications controller for receiving data from a main memory to be transferred to a smart terminal, comprising:
    a host computer system comprising an input/output control processor coupled to a main memory through a common system bus means,
    said main memory having data stored therein to be transmitted to a smart terminal,
    an input/output adapter coupled between said common system bus means and a common data link interface bus,
    a plurality of smart terminals coupled to said common data link interface bus,
    an enhanced data communications data link processor (EDC DLP) of the type having a programmable microprocessor and a dedicated memory, for storing protocols, terminal configurations and other parameters defining the data communications system said EDC DLP being coupled between said smart terminals and said data link interface bus,
    said EDC DLP providing means for receiving information from said main memory of said host computer including data and a designated smart terminal address for receiving said data in a format unacceptable by said designated smart terminal,
    said dedicated memory providing means for storing said received data,
    said EDC DLP further providing means for utilizing the information stored in said dedicated memory and for formatting and pre-packaging said received data in a format acceptable by said smart terminal,
    said formatted pre-packaged data including a plurality of prefix code characters and a suffix code character, and
    means for transmitting said pre-packaged acceptable format text to said designated smart terminal.

2. A high speed data communications controller as set forth in claim 1 wherein said EDC DLP further provides means for polling said designated terminal.

3. A high speed data communications controller as set forth in claim 1 wherein said pre-packaged data for polling a terminal comprises the characters: SYNC, start of header, address, followed by acknowledge, end of text and a block check character.

4. A high speed data communications controller as set forth in claim 3 wherein said block check character provides means for checking proper transmission of said address for polling.

5. A high speed data communications controller for receiving data from a smart terminal to be transferred to user equipment in a computing system, comprising:
    an input/output adapter coupled between a common data link interface bus and a common system bus means connected to a main processor system having an input/output control processor and a main memory,
    a plurality of smart terminals,
    enhanced data communications data link processor means (EDC DLP) connected between said plurality of smart terminals and said data link interface bus,
    said EDC DLP having a programmable microprocessor and a dedicated memory for storing protocols terminal configurations and other parameters defining the data communications system and for receiving data from smart terminals to be transferred to any other device memory in said computing system,
    said EDC DLP providing means for receiving information from said main memory including data and a designated device address for receiving said data in a format unacceptable by said designated device,
    said dedicated memory providing means for receiving said data and an address from a smart terminal,
    said EDC DLP further providing means for utilizing the information stored in said dedicated memory and for formatting and pre-packaging said received data and address in a format acceptable to said designated device,
    said formatted pre-packaged data further including a plurality of prefix code characters and a suffix code character, and
    means for polling said smart terminal to elicit transmission of said information including data and a designated device address for receiving said data.

6. A high speed data communications controller as set forth in claim 5 wherein said EDC DLP further comprises means for receiving data and a device memory address from a smart terminal in response to a first poll.

7. A high speed data communications controller as set forth in claim 6 which further includes means for pre-packaging and generating a second poll in response to receiving said data and a device address from a smart terminal.

8. A high speed data communications controller as set forth in claim 7 wherein said second poll comprises the characters: SYNC, start of header, address, followed by acknowledge, end of text and a block check character.

* * * * *